(12) United States Patent
Li et al.

(10) Patent No.: US 11,272,160 B2
(45) Date of Patent: Mar. 8, 2022

(54) TRACKING A POINT OF INTEREST IN A PANORAMIC VIDEO

(71) Applicant: Lenovo (Singapore) Pte. Ltd., New Tech Park (SG)

(72) Inventors: Scott Wentao Li, Cary, NC (US); Robert James Kapinos, Durham, NC (US); Timothy Winthrop Kingsbury, Cary, NC (US); Russell Speight VanBlon, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 436 days.

(21) Appl. No.: 15/623,517

(22) Filed: Jun. 15, 2017

(65) Prior Publication Data

US 2018/0367777 A1 Dec. 20, 2018

(51) Int. Cl.
*G01S 3/00* (2006.01)
*G06T 7/46* (2017.01)
*H04N 13/189* (2018.01)
*H04N 5/232* (2006.01)
*H04N 7/14* (2006.01)
*H04N 7/15* (2006.01)
(Continued)

(52) U.S. Cl.
CPC ............ *H04N 13/189* (2018.05); *G01S 3/00* (2013.01); *G06T 7/246* (2017.01); *H04N 5/23206* (2013.01); *H04N 5/23238* (2013.01); *H04N 5/232933* (2018.08); *H04N 5/232939* (2018.08); *H04N 7/147* (2013.01); *H04N 9/8205* (2013.01); *G06T 2207/10016* (2013.01); *G06T 2207/20101* (2013.01); *G06T 2207/30201* (2013.01); *H04N 7/15* (2013.01); *H04N 7/18* (2013.01)

(58) Field of Classification Search
None
See application file for complete search history.

(56) References Cited

U.S. PATENT DOCUMENTS 5,850,352 A * 12/1998 Moezzi ............... H04N 13/139
345/419
6,563,529 B1 * 5/2003 Jongerius ........... G06F 3/04815
345/629

(Continued)

OTHER PUBLICATIONS

Argyriou, Lemonia, et al. "Engaging immersive video consumers: Challenges regarding 360-degree gamified video applications." 2016 15th International Conference on Ubiquitous Computing and Communications and 2016 International Symposium on Cyberspace and Security (Iucc-Css). IEEE, 2016. (Year: 2016).*

*Primary Examiner* — Soo Shin
(74) *Attorney, Agent, or Firm* — The Small Patent Law Group LLC; Dean D. Small

(57) ABSTRACT

A computer implemented method, device and computer program device are provided that obtain a panoramic video for a scene, with a coordinate system. The method, device and computer program product identify a point of interest (POI) from the scene within the panoramic video, and track a position of the POI within the panoramic video. The method, device and computer program product record POI position data in connection with changes in the position of the POI during the panoramic video. The method, device and computer program product support play back of the panoramic video and adjustment of the field of view based on the POI position data.

18 Claims, 5 Drawing Sheets

(51) Int. Cl.
  *H04N 7/18* (2006.01)
  *H04N 9/82* (2006.01)
  *G06T 7/246* (2017.01)

(56) References Cited

U.S. PATENT DOCUMENTS

| | | | | |
|---|---|---|---|---|
| 7,768,545 | B2* | 8/2010 | Glatt | G03B 37/00 348/36 |
| 8,682,049 | B2* | 3/2014 | Zhao | G06F 19/00 382/128 |
| 9,076,247 | B2* | 7/2015 | Matjasko | G06T 19/006 |
| 9,179,069 | B2* | 11/2015 | Moriyama | G03B 17/18 |
| 9,372,094 | B2* | 6/2016 | Kankainen | G01C 21/3647 |
| 9,516,225 | B2* | 12/2016 | Banta | H04N 5/23238 |
| 9,570,113 | B2* | 2/2017 | Campbell | H04N 9/806 |
| 9,652,667 | B2* | 5/2017 | MacMillan | G06F 16/71 |
| 9,759,917 | B2* | 9/2017 | Osterhout | G02B 27/0093 |
| 9,781,356 | B1* | 10/2017 | Banta | H04N 5/2628 |
| 9,973,746 | B2* | 5/2018 | Matias | H04N 13/398 |
| 10,043,552 | B1* | 8/2018 | Martin | G11B 27/34 |
| 10,067,559 | B2* | 9/2018 | Wheeler | G06F 3/012 |
| 10,148,876 | B1* | 12/2018 | Ribeiro | H04N 21/2187 |
| 10,198,838 | B2* | 2/2019 | Kumar | H04N 5/23222 |
| 10,217,488 | B1* | 2/2019 | Huang | G06T 3/4038 |
| 10,277,858 | B2* | 4/2019 | Kankaanpaa | G06K 9/00711 |
| 10,417,525 | B2* | 9/2019 | Ji | G06K 9/6232 |
| 2002/0159641 | A1* | 10/2002 | Whitney | G06K 9/6228 382/219 |
| 2002/0186882 | A1* | 12/2002 | Cotman | G06K 9/00127 382/165 |
| 2004/0075738 | A1* | 4/2004 | Burke | G08B 13/19656 348/143 |
| 2004/0105573 | A1* | 6/2004 | Neumann | G06T 17/00 382/103 |
| 2004/0239699 | A1* | 12/2004 | Uyttendaele | G06F 16/748 715/716 |
| 2005/0048432 | A1* | 3/2005 | Choi | A61C 7/00 433/24 |
| 2006/0028542 | A1* | 2/2006 | Rondinelli | H04N 5/04 348/36 |
| 2006/0187305 | A1* | 8/2006 | Trivedi | G06K 9/00241 348/169 |
| 2006/0279630 | A1* | 12/2006 | Aggarwal | G01S 3/7864 348/143 |
| 2007/0058047 | A1* | 3/2007 | Henty | G06F 3/0304 348/211.99 |
| 2007/0070190 | A1* | 3/2007 | Yin | G08B 13/19628 348/36 |
| 2007/0136093 | A1* | 6/2007 | Rankin | G06F 19/3481 705/2 |
| 2008/0002886 | A1* | 1/2008 | Revow | G06K 9/00422 382/187 |
| 2008/0218587 | A1* | 9/2008 | Glatt | G08B 13/1968 348/39 |
| 2010/0299630 | A1* | 11/2010 | McCutchen | G06F 16/7837 715/803 |
| 2012/0113209 | A1* | 5/2012 | Ritchey | H04N 5/2254 348/14.02 |
| 2012/0212405 | A1* | 8/2012 | Newhouse | G02B 27/017 345/156 |
| 2013/0063550 | A1* | 3/2013 | Ritchey | G16H 40/63 348/36 |
| 2013/0129165 | A1* | 5/2013 | Dekel | G06F 19/321 382/128 |
| 2013/0208966 | A1* | 8/2013 | Zhao | G16H 10/60 382/131 |
| 2013/0325319 | A1* | 12/2013 | Moore | G01C 21/3638 701/412 |
| 2014/0043321 | A1* | 2/2014 | Matjasko | G06T 15/00 345/419 |
| 2014/0056520 | A1* | 2/2014 | Rodriguez Serrano | G06K 9/325 382/159 |
| 2014/0358825 | A1* | 12/2014 | Phillipps | G06Q 30/0241 706/11 |
| 2015/0009206 | A1* | 1/2015 | Arendash | G06T 19/006 345/419 |
| 2015/0071528 | A1* | 3/2015 | Marchisio | G06K 9/6269 382/159 |
| 2015/0169975 | A1* | 6/2015 | Kienzle | G06T 1/0007 382/189 |
| 2015/0170053 | A1* | 6/2015 | Miao | G06N 20/00 706/12 |
| 2015/0254871 | A1* | 9/2015 | MacMillan | G06T 3/0062 382/180 |
| 2015/0256746 | A1* | 9/2015 | MacMillan | H04L 65/602 386/285 |
| 2015/0302276 | A1* | 10/2015 | Guan | G06K 9/00771 382/159 |
| 2016/0203391 | A1* | 7/2016 | Connell, II | B25J 9/1697 382/153 |
| 2017/0098330 | A1* | 4/2017 | Inomata | G06F 3/012 |
| 2017/0139578 | A1* | 5/2017 | Dickerson | G06F 3/04815 |
| 2017/0200296 | A1* | 7/2017 | Jones | G06T 11/60 |
| 2017/0237976 | A1* | 8/2017 | Matias | H04N 13/398 348/39 |
| 2017/0302714 | A1* | 10/2017 | Ramsay | H04L 65/601 |
| 2017/0364752 | A1* | 12/2017 | Zhou | H04R 1/326 |
| 2018/0077210 | A1* | 3/2018 | Hannuksela | H04N 21/47217 |
| 2018/0164593 | A1* | 6/2018 | Van Der Auwera | G06T 3/0031 |
| 2018/0332267 | A1* | 11/2018 | Hesla | H04N 13/161 |
| 2018/0374192 | A1* | 12/2018 | Kunkel | G06T 15/205 |
| 2019/0335287 | A1* | 10/2019 | Jung | G06F 3/167 |

* cited by examiner

TRACKING A POINT OF INTEREST IN A PANORAMIC VIDEO

FIELD

The present disclosure relates generally to managing and playing back panoramic videos while tracking one or more points of interest therein

BACKGROUND OF THE INVENTION

Today, video is presented to users in a variety of manners, including the recent introduction of panoramic videos (also referred to as 360° videos). A panoramic video presents a user with the ability to change a view direction within a 360° view of a scene. The user may watch a video while panning left, right, up and down to see other portions of the surrounding scene.

However, limitations exist in connection with navigating through panoramic videos. In particular, a user may pan left or right or change the elevational view up or down multiple times or in such a manner as to lose track of a primary person or object that was the original subject of the video. For example, while watching an individual during an instructional presentation, the viewer may move the field-of-view numerous times until losing track of where the individual is located.

A need remains for improved methods and devices that track points of interest within panoramic videos.

SUMMARY

In accordance with embodiments herein, computer implemented methods are provided that, under control of one or more processors, are configured with specific executable instructions. The method obtains a panoramic video for a scene, with a coordinate system. The system identifies a point of interest (POI) from the scene within the panoramic video, tracks a position of the POI within the panoramic video; and records POI position data in connection with changes in the position of the POI during the panoramic video.

Optionally, the POI position data may include a view angle between the POI and a reference view direction of the coordinate system. The recording may store a plurality of POI position data corresponding to different positions of the POI during different frames in the panoramic video. The tracking includes stepping through at least a portion of frames in the panoramic video and receiving user inputs indicating the position of the POI over at least the portion of the frames.

Optionally, the panoramic video includes a series of frames that are 360° views of the scene over a time period. While playing back the panoramic video, the field of view (FOV) may be adjusted based on a user input. A POI tracker indicative of the position of the POI within the panoramic video may be displayed. The POI tracker may be displayed after the FOV navigates away from the POI. While playing back the panoramic video, the field of view (FOV) may be adjusted based on the POI position data to maintain the POI in the FOV. A POI reset and automatic adjustment the field of view to include the POI in connection with selection of the POI reset may occur.

In accordance with embodiments herein, a device is provided which is comprised of a processor and a memory storing instructions accessible by the processor. Responsive to execution of the instructions, the processor plays back a panoramic video for a scene. The panoramic video has a coordinate system and a point of interest (POI) that moves within the scene. The processor displays a field-of-view (FOV) segment from the panoramic video and changes the FOV segment that is displayed based on POI position data indicating a change in a position of the POI during the panoramic video.

Optionally, responsive to execution of the instructions, the processor may access metadata stored in connection with the panoramic video. The metadata may include the POI position data associated with at least a portion of frames in the panoramic video. The processor may change the FOV segment based on the POI position data within the metadata. The processor may track automatically the POI by adjusting the FOV segment during playback of the panoramic video in connection with automatic tracking of the POI. The processor may adjust the FOV segment to be displayed, based on an FOV user input indicative of a change in the FOV segment. The processor may generate and display a POI tracker that indicates the position of the POI within the panoramic video at a current point in time in playback.

Optionally, responsive to execution of the instructions, the processor may co-display the POI tracker and the FOV segment. The POI tracker may represent a graphic of the scene with an FOV marker and a POI marker. The FOV marker may be indicative of a location of the FOV segment, the POI marker may be indicative of a location of the POI.

Optionally, the device further comprises a 360° microphone unit to collect audio signals, the POI position data based on the audio signals.

In accordance with embodiments herein, computer program product is provided, comprised of a non-signal computer readable storage medium comprising computer executable code to playback a panoramic video for a scene, the panoramic video having a coordinate system with a reference point and having a point of interest (POI) that moves within the scene. A field-of-view (FOV) segment from the panoramic video is displayed and the FOV segment that is displayed is changed based on POI position data indicating a change in a position of the POI during the panoramic video.

Optionally, the computer executable code may further track automatically the POI by adjusting the FOV segment during playback of the panoramic video in connection with automatic tracking of the POI. The computer executable code may also adjust the FOV segment to be displayed, based on an FOV user input indicative of a change in the FOV segment.

DETAILED DESCRIPTION

Figure 1:
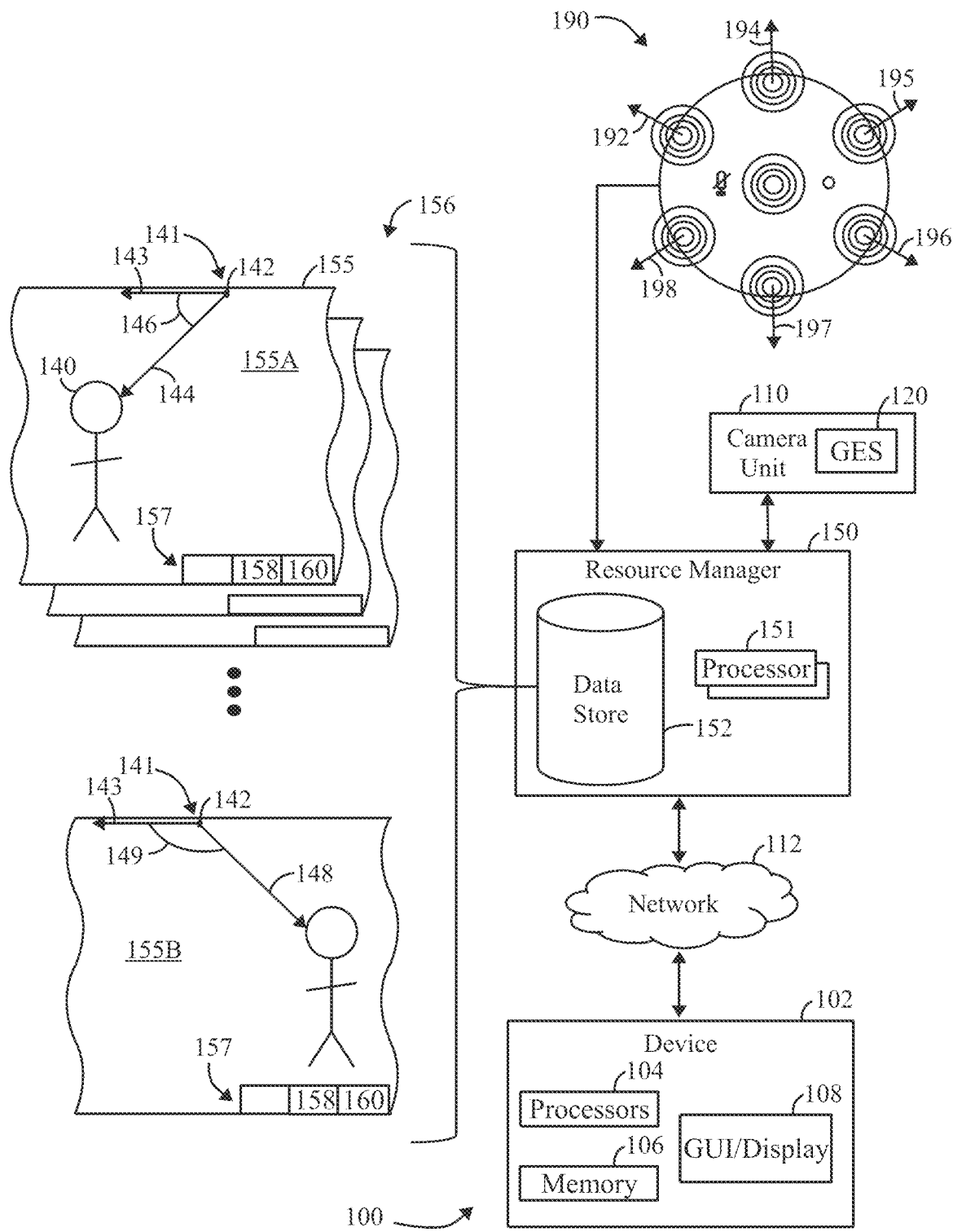
FIG. 1 illustrates a system formed in accordance with embodiments herein.

It will be readily understood that the components of the embodiments as generally described and illustrated in the Figures herein, may be arranged and designed in a wide variety of different configurations in addition to the described example embodiments. Thus, the following more detailed description of the example embodiments, as represented in the Figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Definitions

The terms "up", "down", "left", "right", "pan" and "elevation" shall define directions with respect to the display and/or interface of the device.

The term "panoramic video" refers to a video recording that includes a continuous view in multiple directions. Non-limiting examples of a panoramic video is a 360-degree video, a spherical video and an immersive video. The panoramic video may not provide a full 360° panoramic view of a scene, but instead will at least provide more than a 180° panoramic view of a scene (in the left/right or panning direction), and/or more than a 90° view of a scene (in the up/down or tilt direction). The panoramic video may not include a 180° elevation range with a view directly above and/or below the camera (origin). Instead, the panoramic video may include an elevation range of 100°-170°, without a view of the scene directly above and/or below the camera. The video recordings are recorded in multiple directions at the same time, such as when utilizing an omnidirectional camera or a collection of cameras. During playback the viewer has control of the viewing direction (e.g., a panorama). The term "view angle" refers to one or both of an angle in the panning direction and/or an angle in an elevation direction between a view direction and a reference direction. For example, a POI view angle refers to one or both of a pan and/or elevational angle between a reference direction extending from an origin of the coordinate system and a radial line extending from the origin of the coordinate system to a select point, such as the POI. As another example, a field-of-view angle refers to one or both of pan and/or elevational angles between the reference view direction and a radial line extending from the origin of the coordinate system along a central viewing line of sight within the field-of-view.

The terms "field-of-view" or "FOV" refer to a portion of a frame of the panoramic video that could be presented on a display at one point in time. As one example, the FOV may have a pan range of 160° and an elevational range of 110°. Although it is recognized that the FOV ranges may be adjusted by the user through the GUI, and different devices will have different display capabilities. The FOV may be centered around an FOV center line of sight or FOV viewing direction.

The term "FOV segment" refers to an FOV that is actually presented on a display. As one example, a user may watch a portion of the panoramic video without changing the field-of-view, such that the user views activity occurring over time within a particular FOV segment of the panoramic video. As another example, the user may adjust FOV segment while the panoramic video runs and/or while the panoramic video is paused or stopped on an individual frame within the panoramic video.

The term "POI tracker" refers to graphical indicia representative of at least a portion of the scene from a desired perspective, such as from above the scene (e.g., a perspective as though an observer were a bird). The POI tracker may include bird's-eye view graphical indicia represented as an animation, sketch or cartoon version of a generic scene, which may be complex or very simple. A simple example of a bird's-eye view graphical indicia merely represents a bull's-eye graphic and/or a circular graphic with some or no radial markers. Additionally or alternatively, the bird's-eye view graphic may include an actual rendered image from an elevational view based on the video content within the panoramic video. Non-limiting examples of a bird's-eye view include blueprints, floor plans, maps, aerial photographs and the like. The POI tracker may be from a side perspective or rear view perspective. The POI tracker is presented on or adjacent the FOV segment that is displayed.

System Overview

FIG. 1 illustrates a system 100 formed in accordance with embodiments herein. The system 100 includes a device 102 that may be mobile, stationary or portable handheld. Optionally, the device 102 may represent a set of virtual reality glasses, and/or a smart phone or other portable device mounted within a virtual reality headset. The device 102 includes, among other things, a processor 104, memory 106, and a graphical user interface (GUI) (including a display) 108. The system 100 also includes a resource manager 150 (e.g., server) that includes one or more processors 151 and a data store 152 that stores a collection of panoramic videos 156. The device 102 and resource manger 150 communicate over a network 112. One or more of the panoramic videos 156 may include metadata 157 that includes POI position data 158. Each of the panoramic videos 156 may also include POI attributes of interest 160 stored there with, such as in the metadata 157. Alternatively or additionally, the POI position data 158 and/or the POI attributes of interest 160 may be stored separate from the panoramic videos, but uniquely associated there with. Each panoramic video 156 is defined relative to a reference coordinate system. When the reference coordinate system utilizes polar coordinates, the reference coordinate system also includes a reference view direction that is utilized in defining view angles for POIs and FOVs.

The panoramic video 156 includes a series of frames that may be 360° views of the scene over time. In FIG. 1, a panoramic video 156 is illustrated to include a plurality of frames 155, where each frame has corresponding metadata 157. For purposes of explanation, a start frame 155A and an intermediate frame 155B are illustrated in more detail. The start and intermediate frames 155A and 155B are defined relative to a reference coordinate system 141 that corresponds to a polar coordinate system having an origin 142 and reference view direction 143. It is recognized that additional or alternative coordinate systems may be utilized and may be defined in different manners. The start and intermediate frames 155A and 155B include corresponding metadata 157 with corresponding POI position data 158 and POI attributes of interest 160.

The start frame 155A illustrates a point of interest 140 that corresponds to an individual or an individual's face. The individual is located at a position within the frame 155A spaced apart from an origin 142 of a reference coordinate system associated with the panoramic video 156. The POI 140 is positioned a first radial distance 144 from the origin 142, where the first radial distance 144 is oriented at a first POI view angle 146 relative to a reference view direction 143 of the reference coordinate system 141. The intermediate frame 155B illustrates the point of interest 140 at a different position within the frame 155B. The POI 140 is spaced apart from the origin 142 of the reference coordinate system by a second radial distance 148, where the second radial distance 148 is oriented at a second POI view angle 149 from the reference view direction 143 of the reference coordinate system 141. The second radial distance 148 and second POI view angle 149 differ from the first radial distance 144 and first POI view angle 146. The POI position data 158 in the metadata 157 of the first frame 155A records the first radial distance 144 and first view angle 146, while the POI position data 158 in the metadata 157 of the intermediate frame 155B records the second radial distance 148 and second view angle 149.

The metadata 157 may also include ancillary content, such as the existence of foreign items or obstructions in the object or scene, such as shadows, telephone poles, cars, people, other background items and the like. Embodiments herein may utilize the ancillary content to determine adjustments in the FOV. For example, the ancillary content may indicate that undesirable background objects will appear in the scene when viewing the POI from a particular viewpoint. Accordingly, the system 100 may adjust the FOV in order to shift a location of the POI within the field-of-view, while removing the undesirable background objects from the FOV.

As explained herein, the device 102 and/or resource manager 150 may analyze a panoramic video 156 to generate the POI position data 158 in connection there with. For example, the device 102 and/or resource manager 150 may obtain a panoramic video for a scene, where the panoramic video has a coordinate system with a reference point. The device 102 and/or resource manager 150 identify a point of interest (POI) from the scene within the panoramic video. The device 102 and/or resource manager 150 track and record a position of the POI within the panoramic video and record POI position data in connection with changes in the position of the POI during the panoramic video. The tracking and recording operations may be performed automatically and/or in connection with user inputs. For example, the device 102 and/or resource manager 150 may step through at least a portion of the frames to display the frames. A user utilizes a user input to direct the FOV in a desired direction, such as to orient the FOV to include a POI. The user enters inputs indicating positions of the POI over at least a portion of the frames. Based on the user inputs, the device 102 and/or resource manager 150 calculate a corresponding radial distance and/or POI viewing angle for some or all of the frames.

Additionally or alternatively, the device 102 and/or resource manager 150 may automatically step through one or more frames of the panoramic video 156 to automatically identify one or more POI. The automatic identification may be based on segmentation, object recognition algorithms and the like. When automatically identifying a POI, the device 102 and/or resource manager 150 may automatically designate the POI and/or utilize a user input as a reference to initially identify a POI. The recorded POI position data 158 includes view angles between the POI and the reference view direction for all or a portion of the frames of the panoramic video. The recorded POI position data 158 may include a plurality of POI position data corresponding to different positions of the POI during different frames from a corresponding plurality of frames in the panoramic video.

The automatic tracking process may be performed as a panoramic video is recorded, after recording the panoramic video but before playback and/or during playback of the panoramic video. As one example, when a user begins playing a panoramic video, the user may designate the POI. Thereafter, while the user views the video, the device 102 and/or resource manager 150 perform an automatic tracking process, as described herein, to identify the POI in subsequent frames (e.g., in real-time during playback).

In the example of FIG. 1, the collection of panoramic videos 156 is saved on a server 150 remote from the device 102. The device 102 communicates with resource manager 150, as explained herein, to utilize the panoramic videos 156. Optionally, the collection of panoramic videos 156 may be stored locally in the memory 106 of the device 102, thereby rendering optional, the communication with the resource manager 150 in real time while viewing panoramic videos 156. Alternatively or additionally, a subset of the collection of panoramic videos 156 may be downloaded from the resource manager 150 to the memory 106. The subset of the panoramic videos 156 may be downloaded temporarily, or for an extended period of time or permanently, to the memory 106. For example, when a user plans (or is on) a vacation, business trip, hike, picnic or other travel activity, the user may go online and download a select subset of the collection.

The system 100 also includes one or more digital camera unit 110. The camera unit 110 records panoramic videos (e.g., 360° videos) for a scene and saves the panoramic videos local in memory, on a device 102 and/or on a data store 152. The camera unit 110 may include an accelerometer to track movement of the camera unit(s) 110.

A 360° video may be recorded using either multiple cameras, or using a dedicated camera that contains multiple camera lenses embedded into the device, that film overlapping angles simultaneously. Through video stitching, the separate footage is merged together into one panoramic video piece, and the color and contrast of each frame is calibrated to be consistent with one another. The stitching process is done either by the camera itself, or using video editing software that can analyze common visuals and audio to synchronize and link the different camera feeds together. Specialized omnidirectional cameras have been developed for the purpose of filming 360-degree video, including rigs such as GoPro's Omni and Odyssey, the Nokia OZO, the Facebook Surround 360, the Kodak Pixpro SP360 4K Dual Pack Pro and the Axon's AZilPix Studio.One (all of which include multiple cameras installed into a single rig), the Vuze camera, handheld dual-lens cameras such as the Ricoh Theta S and Samsung Gear 360, and the Kogeto Dot 360—a panoramic camera lens accessory developed for the iPhone 4, 4S, and Samsung Galaxy Nexus. In videoconferencing embodiments herein, 360° cameras are used, so that all participants at one location can be recorded with one camera.

Optionally, the camera unit 110 may include a global positioning system (GPS) tracking circuit 120 to calculate the geographic coordinates of the camera unit 110 while collecting video to form a panoramic video. The GPS tracking circuit 120 includes a GPS receiver to receive GPS timing information from one or more GPS satellites that are accessible to the GPS tracking circuit 120. The GPS tracking circuit 120 may also include a cellular transceiver configured to utilize a cellular network when GPS satellites are not in line of sight view and/or to utilize the cellular network to improve the accuracy of the GPS coordinates.

Optionally, the system 100 also includes a 360° microphone unit 190 that is electrically coupled to the resource manager 150, the camera unit 110, and/or the device 102. The microphone unit 190 includes multiple directional microphones 192-198 that are oriented in different directions and configured to have predetermined directionality. It is understood that more or fewer microphones may be utilized. Also, while the microphone unit 190 is illustrated as a single integrated device, it is understood that multiple separate and discrete microphones may be utilized in combination to functionally form a 360° microphone unit 190. When recording a panoramic video, the microphone unit 190 collects audio signals from the directional microphones 192-198. The resource manager 150 and/or device 102 may utilize the audio signals from the directional microphones 192-198 to track movement of an individual, animal or other object that emits audible sound.

Optionally, the audio signals from the microphones 192-198 may be utilized to determine directional information for a sound origin (e.g., as defined in polar coordinates). The sound directional information related to the sound origin may be stored as metadata with a panoramic video. Additionally or alternatively, the sound directional information related to the sound origin may be utilized to calculate POI position data that is stored as metadata with the panoramic video. The sound directional information for the sound origin may be utilized during playback to guide the field-of-view to the point of interest. The field-of-view may be gradually moved with movement indicated by the sound directional information and/or the field-of-view may "snap to" a particular position based on the sound directional information.

For example, the POI may represent an individual who is speaking while moving. The audio signals from the microphones 192-198 may be utilized to track movement of the individual and/or to shift the POI between different individuals. For example, it may be desirable to shift the POI between different individuals who are speaking at a meeting or conference. Different individuals located throughout a conference room may speak at different times, and thus one individual may represent the POI only while speaking. Based on the movement or change in speaker, as indicated by the audio signals, the device 102 and/or resource manager 150 update POI position data. For example, when the audio signals indicate that the speaker is on the left side of a conference room, the POI position data may define a viewing direction to the left side of the conference room. When the same individual or another individual begins speaking on the right side of the conference room, the POI position data for the corresponding frames of the panoramic video may define a viewing direction to the right side of the conference room.

The device 102 and/or resource manager 150 also provide playback of panoramic videos after POI position data has been recorded in connection there with. While playing back the panoramic video, a user may enter inputs designating adjustments to the field of view. Based on user inputs, the FOV segment presented on the display is changed. In accordance with some embodiments, a POI tracker is presented on the display, where the POI tracker is indicative of the position of the POI within the panoramic video. The POI tracker may always be presented on the display and/or only presented when the displayed FOV segment has moved away from the POI. For example, the user may navigate the displayed FOV segment in a manner that no longer includes the POI. For example, the user may be permitted to adjust the field-of-view to look elsewhere. A POI tracker may be utilized to show the user where the POI is located within the panoramic video, even when the POI is not in the displayed FOV segment. Optionally, a POI reset icon/input may be provided as a shortcut to allow the user to reset the field-of-view relative to the POI. When selected by the user, the POI reset directs the system to automatically adjust the field-of-view to a position that includes the POI. The POI reset may represent a gesture or spoken command by the user (e.g., a wave of the arm, a quick movement of a smart phone, a command "resent view on speaker").

Additionally or alternatively, the device 102 and/or resource manager 150 may provide an automatic playback mode in which the panoramic video is automatically played back and the FOV segment is adjusted automatically based on the POI position data in order to maintain the POI within the field-of-view. As one example, the FOV segment may be repeatedly update to maintain the POI at a particular position within the field-of-view. The updates in the FOV segment may be performed continuously, or alternatively only made when the POI is about to leave a current FOV segment.

Tracking Process

Figure 2:
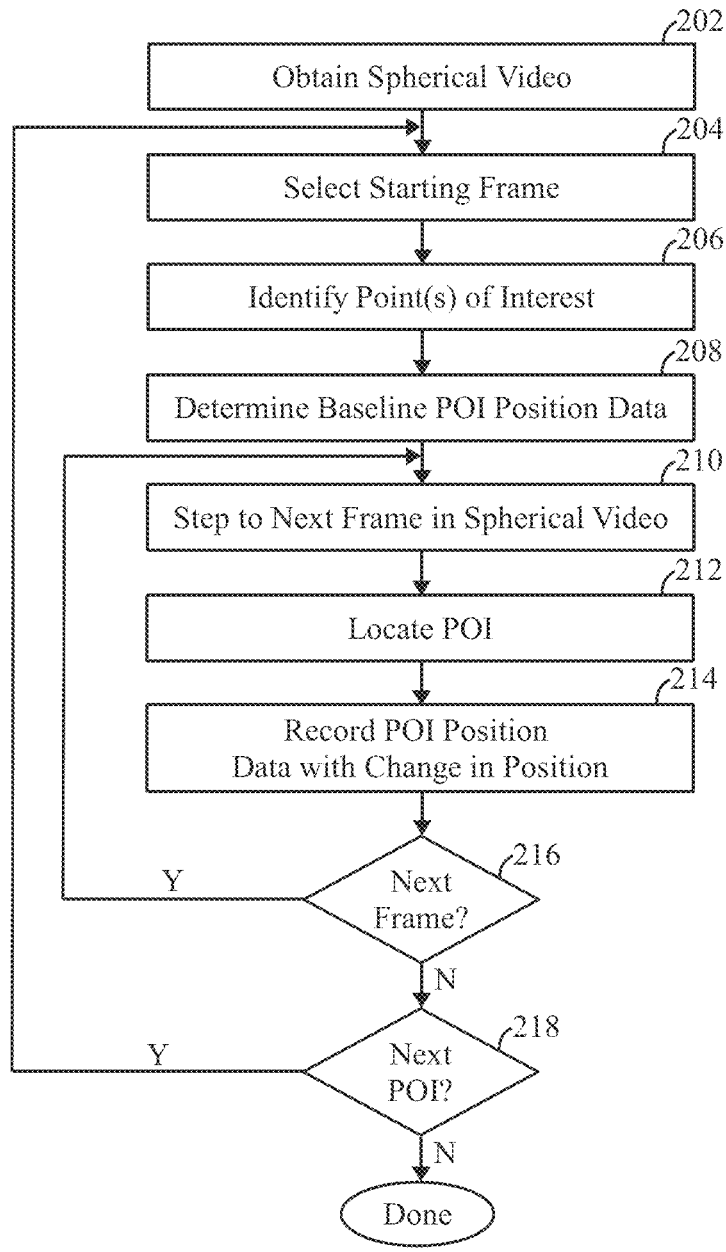
FIG. 2 illustrates a POI tracking process implemented in accordance with embodiments herein.

FIG. 2 illustrates a POI tracking process implemented in accordance with embodiments herein. The operations of FIG. 2 may be implemented by one or more processors within one device or distributed between more than one of the devices, resources or other components described herein. The operations of FIG. 2 may be implemented in different orders, in parallel or in series. The operations of FIG. 2 are described primarily in connection with tracking a single object or individual, however it is recognized that the operations of FIG. 2 may be implemented in connection with multiple objects/individuals within a common panoramic video.

At 202, the one or more processors obtain a panoramic video. For example, the panoramic video may be stored in memory at various locations, where the panoramic video is accessed from memory, such as in connection with a request from browser on a user device. Numerous types of videos may be obtained over the Internet or other network, such as form websites and the like. Additionally or alternatively, the panoramic video may be captured and viewed together in real time by a 360° camera. Optionally, a combination of conventional cameras may collect corresponding two-dimensional videos that are combined through rendering to form a panoramic video.

The panoramic video is defined relative to a coordinate system, such as a polar or Cartesian coordinate system. The coordinate system includes an origin, which may be designated at a center point corresponding to the camera or cameras that capture the panoramic video. A position of various content within the panoramic video may be designated at points and/or based on directions within the coordinate system. For example, a point within a polar coordinate system may be located by a radial distance from a fixed origin, a polar angle measured from a fixed zenith direction and an azimuth angle of an orthogonal projection of a reference plane that passes through the origin and is orthogonal to the zenith, as measured from a fixed reference direction on the plane. The radial distance may be referred to as the radius or radial coordinate, while the polar angle may be referred to as the zenith angle, normal angle or inclination angle. Optionally, points within a Cartesian coordinate system may be designated by X, Y and Z coordinates relative to the origin.

At 204, the one or more processors select a start frame, from which POI tracking begins. For example, the start frame may represent the first frame or an intermediate frame within the panoramic video. The start frame may be manually or automatically selected. For example, the user may play the panoramic video and adjust the displayed field-of-view segment from the panoramic video until identifying a POI. Alternatively, the one or more processors may automatically step through a portion of the frames within the panoramic video to search for a POI. Once a frame is identified that includes the POI, the process of FIG. 2 continues. It is recognized that the start frame may occur at an intermediate point within the panoramic video, with preceding and succeeding frames subsequently analyzed and displayed in accordance with the operations described herein.

At 206, the one or more processors identify a point of interest. The POI may be identified in various manners. For example, the POI may be identified based on user inputs. For example, a display on a device may present a still image (e.g., frame) or a video segment (e.g., series of frames) from the panoramic video. The user may use a graphical user interface of a device to designate the POI. For example, the user may manipulate a mouse, touchpad or other user input to navigate a cursor to the face of an individual within the panoramic video. The user then designates the individual (e.g., a mouse click, key entry, spoken command and the like) to represent the POI. The user may repeat the process to designate multiple POIs. Additionally or alternatively, the user may utilize a graphical user interface, to designate a POI, by drawing a box or other boundary around an individual's face, torso, body. Optionally, the POI may correspond to an animal, an inanimate object, a moving object and the like. The user may designate the POI by "clicking on" the animal, object, etc., drawing a box around the object or otherwise.

Optionally, a POI may represent a point in open space within a scene. For example, the audio signals from the 360° microphone may be used to designate a viewing direction as a POI associated with an audible sound, but without associating the POI with one person. In this example, the POI is defined by a POI view angle and does not include a radial distance. The POI position data may only include POI view angle and no radial distance data.

Additionally or alternatively, the POI may be identified automatically by the one or more processors. For example, the processors may begin with the first frame in the panoramic video and analyze the content of the frame to identify an object/individual in the frame. Additionally or alternatively, the processors may analyze multiple frames or the entire panoramic video to identify one or more primary objects/individuals who are prominent in multiple frames of the panoramic video. Alternatively, the processors may be provided with initial information regarding an individual of interest. For example, the initial information may include a picture or description of an individual. The processors may utilize facial or object recognition or some other type of automated image analysis to identify one or more individuals of interest. Additionally or alternatively, the processors may identify numerous POIs within the panoramic video, and thereafter tracking each of the POIs as explained hereafter in connection with a single POI.

The identification of the POI may include various types of information. For example, when a user manually selects an individual as the POI, the processors may perform facial recognition of the POI and save characteristics of the facial recognition (as POI attributes of interest 160) to be utilized in subsequent operations for identifying the POI in subsequent frames. Additionally or alternatively, at 206, the processors may utilize segmentation to identify the POI. For example, segmentation may be utilized to identify a boundary or characteristics of the POI (e.g., a shape of an individual's torso, coloring in clothing, etc.) as POI attributes of interest 160. The segmentation may then be utilized to track incremental movement of the individual/object within the boundary of the segmentation frame to frame.

At 208, the one or more processors determine baseline POI position data. The baseline POI position data identifies a position of the POI within the start frame of the panoramic video. The baseline POI position data may represent coordinates within a reference coordinate system of the panoramic video. For example, the reference coordinate system may be defined relative to the location of the camera or cameras used to form the panoramic video. The reference coordinate system may utilize Cartesian coordinates or polar coordinates or another coordinate system. When utilizing polar coordinates, the baseline POI position data may include an elevational angle, panning angle and distance from the origin of the reference coordinate system.

At 210, the one or more processors step to a next frame in the panoramic video. The next frame in the panoramic video includes a 360° view of the scene at a particular point in time following the point in time at which the prior frame was obtained. Optionally, the processors may step to another frame that may correspond to a different point in time relative to the start frame. For example, at 210, the processors may step forward by a predetermined number of frames corresponding to a predetermined duration of time. Additionally or alternatively, the processors may step forward multiple frames until identifying a frame that has content of interest. For example, the process of FIG. 2 need not analyze every single frame in a panoramic video. Instead, the process of FIG. 2 may only analyze a subset of the frames within the panoramic video, where the subset of frames is distributed apart from one another across the panoramic video. The frames within the subset make correspond to frames in which the POI has moved a particular distance, relative to a baseline POI position data and/or a prior POI position data. For example, after the start frame is analyzed, the next frame analyzed in FIG. 2 may correspond to a frame in which the POI has moved beyond the initial field-of-view centered about the POI in the start frame. For example, if the field-of-view affords a 160° angle with the POI centered within the field-of-view in the start frame, at 210, the processors may step forward to select a next frame at which the POI is located a select distance from the position in the start frame. Optionally, the processors may step to a next frame at which the POI has left the field-of-view of the start frame and/or where the POI is at a boundary of the field-of-view corresponding to the start frame.

At 212, the one or more processors analyze the next frame to identify the position of the POI. The analysis at 212 may include all or a portion of the operations described above in connection with 208. For example, the analysis at 212 may correspond to the user manually designating a position of the POI in the next frame. Additionally or alternatively, the processors may automatically analyze the content of the next frame to determine the location of the POI, such as through segmentation, object recognition, object tracking, and the like. The POI attributes of interest may be used in the object recognition, object tracking, etc.

Optionally, at 212, the one or more processors may utilize audio signals to locate and track a POI. As noted above, in accordance with at least some embodiments herein, a 360° microphone unit (and/or a collection of separate microphones operating together) may be utilized to collect audio signals from different regions within the scene. The one or more processors utilize the audio signals from the directional microphones 192-198 to track movement of an individual, animal or other object that emits audible sound. For example, the audio signals may be used to calculate sound directional information that is added to the metadata associated with the panoramic video. All or a portion of the frames within the panoramic video may include sound directional information. The sound directional information may be used to automatically redirect the field-of-view to the location corresponding to the sound origin. By embedding the sound directional information in the metadata, embodiments herein allow the sound information to be used during playback to guide a user to a point of interest. Additionally or alternatively, one or more POI trackers may be generated based on the sound directional information. For example, an arrow may be provided within the field-of-view indicating a direction in which the field-of-view should be moved to track the location of the sound origin.

For example, the POI may represent an individual who is speaking while moving. The audio signals may be utilized to track movement of the individual and/or to shift the POI between different individuals. For example, it may be desirable to shift the POI between different individuals who are speaking at a meeting or conference. Based on changes in the location of audio signals, the processors update the POI position data. For example, when the audio signals indicate that the speaker is on the left side of a conference room, the POI position data may define a viewing direction to the left side of the conference room. When the same individual or another individual begins speaking on the right side of the conference room, the POI position data for the corresponding frames of the panoramic video may be updated to define a viewing direction to the right side of the conference room. Accordingly, in accordance with embodiments herein, a 360° microphone may be utilized to track sounds and use directionality to redirect the POI. Further, during automated playback and automated tracking, the directionality of the sounds may be utilized to manage the FOV segment presented.

At 214, POI position data is recorded in connection with the change in the position of the POI over a duration of the panoramic video. For example, the POI position data may correspond to an absolute position at a point in time within the panoramic video, where the absolute position is with respect to the coordinate system associated with the panoramic video (e.g., Cartesian or polar coordinates designating the POI). Additionally or alternatively, the POI position data may correspond to a position change from a prior position and/or from a baseline POI position data. For example, when the POI position data represents a position change, the POI position data may include a change in pan angle, change in elevational angle and/or change in radial distance, with respect to the prior or baseline POI position data. The POI position data is recorded in connection with the current frame. As one example, the POI position data may be recorded as metadata in connection with the panoramic video. In addition to position information, the POI position data includes a frame/time reference, such as a timestamp, frame number and/or other indicators designating the point within the panoramic video for which the POI position data corresponds.

At 216, the one or more processors determine whether additional frames within the panoramic video should be processed. For example, the processors may i) step through the entire panoramic video frame by frame, ii) jump forward a select number of frames, iii) identify frames at which a POI moves between fields of view, etc. When additional frames are to be reviewed, flow returns to 210 where the next frame is selected and the operations at 210-216 are repeated. Otherwise, flow moves to 218.

At 218, the one or more processors determine whether additional POIs are to be identified and analyzed within the panoramic video. When additional POIs are to be analyzed, flow returns to 204 and the operations at 204-218 are repeated. Otherwise, the process of FIG. 2 ends.

Optionally, the operations of FIG. 2 may be performed in parallel in connection with multiple POIs. For example, common or different start frames may be identified for multiple POIs, each of which has a baseline POI position data. The panoramic video may be stepped through to identify multiple POIs in corresponding individual frames and/or different frames.

The automatic tracking process may be performed as a panoramic video is recorded, after recording the panoramic video but before playback and/or during playback of the panoramic video. As one example, when a user begins playing a panoramic video, the user may designate the POI. Thereafter, while the user views the video, the device 102 and/or resource manager 150 perform an automatic tracking process, as described herein, to identify the POI in subsequent frames (e.g., in real-time during playback).

Figure 3:
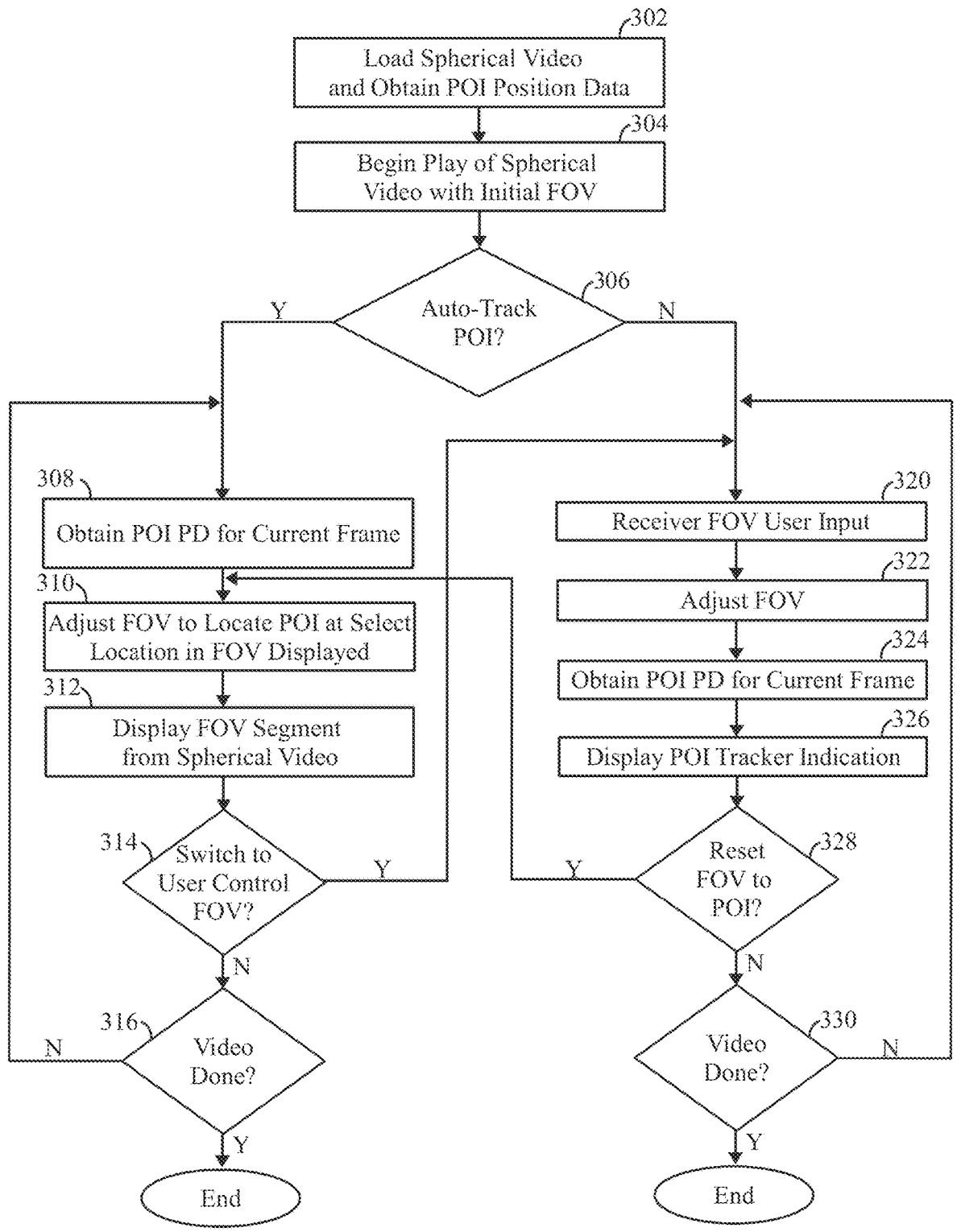
FIG. 3 illustrates a process for replaying a panoramic video in accordance with embodiments herein.

FIG. 3 illustrates a process for replaying a panoramic video in accordance with embodiments herein. The operations of FIG. 3 may be implemented by one or more processors within one (or distributed between more than one) of the devices, resources or other components described herein. The operations of FIG. 3 may be implemented in different orders, in parallel or in series. The operations of FIG. 3 are described primarily in connection with tracking a single object or individual, however it is recognized that the operations of FIG. 3 may be implemented in connection with multiple objects/individuals within a common panoramic video.

At 302, the one or more processors load a panoramic video from memory and obtain one or more POI position data in connection there with. The panoramic video may be loaded in real time while the panoramic video is being captured by one or more cameras, or the panoramic video may be prerecorded and loaded from a memory at one or more devices (e.g., when viewing video from a website in a local browser). The panoramic video may be recorded locally or remotely, stored in the cloud, downloaded over the Internet and the like. The POI position data may be obtained as metadata from the panoramic video, obtained as metadata from another source, or otherwise. The POI position data may be stored and conveyed separately from or in connection with the panoramic video.

At 304, the one or more processors begin playing the panoramic video with an initial field-of-view. The initial field-of-view may be defined within metadata associated with the panoramic video, designated by the user, automatically selected and the like. At 306, the one or more processors determine whether the presentation of the panoramic video should be performed in connection with automatic tracking of the POI or otherwise. When automatic tracking of the POI is to be implemented, flow moves to 308. Otherwise, flow branches to 320.

At 308, the one or more processors obtain the POI position data for a current frame being displayed from the panoramic video.

At 310, the one or more processors adjust the field-of-view displayed for the current frame in order to locate the POI at a select location within the field-of-view as displayed. For example, the initial field-of-view (chosen at 304) may not include the POI or may include the POI at an undesirable location (e.g., along a boundary of the field-of-view). The processors at 310 shift the field-of-view to position the POI in a desired portion of the displayed scene. For example, the field-of-view may be shifted to be centered upon the POI, or alternatively to be centered at a desired viewing angle relative to the POI (e.g., with the POI to the left or right side of the center of the viewing angle). The adjustment at 310 also adjust the elevational angle of the field-of-view to position the POI at a desired elevational location. For example, when the POI is an adult, the processors may adjust the elevational angle to raise the field-of-view to correspond to the face or torso of the individual. As another example, when the POI is a child or animal, the elevational angle of the field-of-view may be lowered to center the child or pet in the field-of-view elevational direction.

At 312, the one or more processors manage display of an FOV segment from the panoramic video. The FOV segment represents the portion of the panoramic video displayed within the current field-of-view. The FOV segment presented within the display may represent a still image or frozen frame, or a video segment. The panoramic video may be continuously played at 312, while displaying a chosen FOV segment. The video may be continuously played at 312 until various actions occur. For example, the video may be played until a user input is received (e.g., pause, stop, rewind, fast-forward). Optionally, the user input may represent an instruction to change the field-of-view, as well as any other user interface command. Additionally or alternatively, the video may be continuously played at 312 until a change occurs in connection with the POI. For example, the POI may move out of the field-of-view, out of a desired range within the field-of-view, or otherwise changes position. When a change occurs in connection with the POI and/or a user input is received, flow advances to 314.

At 314, the one or more processors determine whether a user input has been received requesting a user control to change in the field-of-view. For example, the user may wish to pan the field of view left or right, shift the elevation of the field-of-view up or down or otherwise. When it is desirable to switch to a user controlled field-of-view, flow moves to 320. Otherwise, flow continues to 316. At 316, the one or more processors determine whether the panoramic video has completed and if so, the process ends. If the panoramic video has not completed playback, flow moves from 316 back to 308 and the operations at 308-316 are repeated.

Optionally, the process at 308-316 may be continuously performed without a delay being introduced at 312. For example, the process may continuously obtain POI position data for each frame at 308, adjust the field-of-view at 310 in connection with each frame (when needed) and then present the FOV segment for the next frame. Optionally, the decision at 314 may be omitted entirely.

Returning to 306, when it is determined that auto tracking of the POI is not desired, flow moves to 320. At 320, one or more processors receive an FOV user input. The FOV user input may represent an instruction, entered through a graphical user interface, related to a field-of-view currently being displayed. For example, the FOV user input may represent an indication to pan the FOV left or right, up or down, or in another direction. The FOV user input may represent an indication to jump to an entirely different field-of-view (e.g., to look straight up, straight down, behind the viewer).

At 322, the one or more processors adjust the field-of-view segment that is displayed to correspond to the field-of-view user input. At 324, the one or more processors obtain a POI position data for the current frame or frames being displayed.

At 326, the one or more processors generate and display a POI tracker indicator that indicates a location of the POI within the panoramic video at the current point in time in playback. The POI tracker may represent a graphic, text message, numeric values, color shading information and the like. As one simple example, the POI tracker may represent an arrow indicating in a direction in which the field-of-view should be shifted (e.g., panned, elevated, etc.) to move the FOV to the POI. For example, an arrow pointing to the left may indicate that the POI is to the left of the present FOV, while an arrow pointing to the right may indicate that the POI is to the right of the present FOV. As another example, a text message may be presented to indicate that the POI is behind the viewer, by another object in the scene, on the viewers left, on the viewer's right, etc. Optionally, the POI tracker may represent a heads up display type graphic, such as a top-down or birds-eye view graphic of the scene related to the panoramic video. Within the birds-eye view graphic, a POI marker may indicate the POI. Additionally, the top-down view may include an FOV marker indicating boundaries of the current FOV, such as to provide the user with a visual relation between the current FOV and the position of the POI.

At 328, the one or more processors determine whether the displayed field-of-view should be reset to correspond to the location of the POI. For example, a user may navigate the FOV segment that is displayed to be far away from the POI. User may desire to reset the FOV segment relative to the POI, such as by entering a reset command through the graphical user interface. For example, the user may want to reset the FOV segment at the POI when the user i) becomes disoriented, ii) shifts the FOV segment far away from the POI or iii) for various other reasons. The reset command affords a quick and easy manner by which the FOV segment may be shifted, such as without holding down an arrow key to slowly pan or change the elevation of the FOV segment or performing a reset gesture, etc. When a reset command is received, flow moves from 328 to 310, where the operations of 308-314 are performed as described herein. Alternatively, when no reset command is received, flow moves from 328 to 330. At 330, the one or more processors determine whether the panoramic video has completed playback. When the panoramic video has completed, the process ends. Otherwise, flow returns from 330 to 320 and the operations at 320-328 are repeated.

Figure 4B:
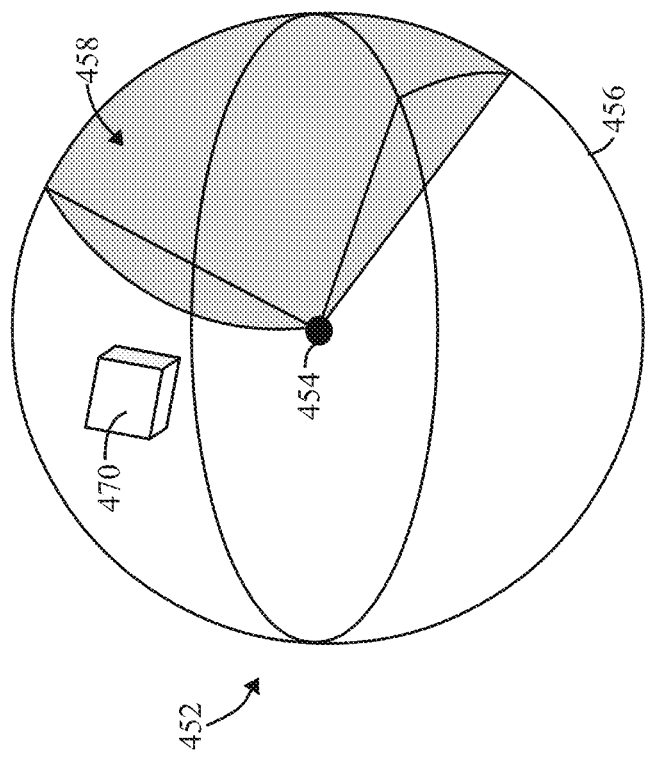
FIG. 4B illustrates examples of POI trackers that may be co-displayed with a panoramic video in connection with embodiments herein.
Figure 4A:
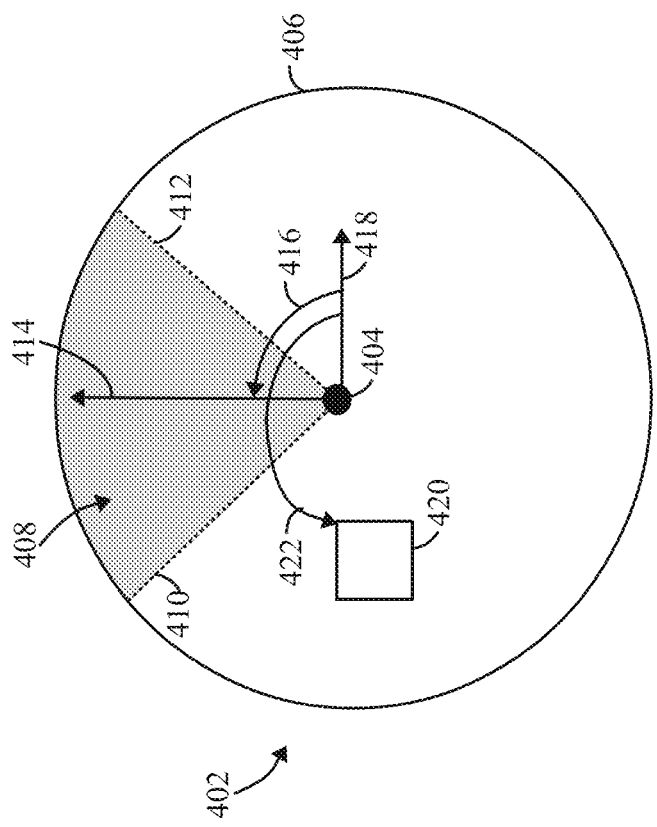
FIG. 4A illustrates examples of POI trackers that may be co-displayed with a panoramic video in connection with embodiments herein.

FIGS. 4A-4B illustrate examples of POI trackers that may be co-displayed with a panoramic video in connection with embodiments herein. The POI trackers may represent bird's-eye view graphics may be superimposed upon the panoramic video and/or displayed in a separate region or window. FIG. 4A illustrates the POI tracker 402, as a bird's-eye view graphic, that includes a center 404 corresponding to a central location of the camera or cameras utilized to capture the panoramic video. The POI tracker 402 includes a boundary 406 which may be arbitrarily defined or defined to correspond to a physical aspect of the scene. The POI tracker 402 includes an FOV marker 408 (e.g., a blank, colored or shaded pie section) corresponding to, and indicative of a location of, the FOV segment currently being displayed. The FOV marker 408 includes lateral boundaries 410, 412 corresponding to the edges of the FOV segment. The POI tracker 402 includes a POI marker 420 corresponding to, and indicative of a location of, the POI.

Optionally, the POI tracker 402 may include an FOV viewing direction marker 414 that is centered within the FOV marker 408 to indicate a central line of sight associated with the current FOV segment. Optionally, an FOV viewing angle 416 may be illustrated between the FOV viewing direction marker 414 and a reference direction 418 corresponding to the reference coordinate system. Optionally, a POI viewing angle 422 may be illustrated between the POI marker 420 and the reference direction 418. Optionally, the graphics at reference numerals 414, 416, 418 and 422 may be omitted entirely.

While not illustrated, it is understood that the POI tracker 402 may be duplicated from a different perspective, such as from a side view, rearview and the like. Indicia may be provided with the POI tracker 402 to inform the viewer of the perspective (e.g., bird's-eye view, left side view, rearview, etc.).

FIG. 4B illustrates an example of an alternative graphic that may be co-displayed with a panoramic video in connection with embodiments herein. The graphic 452 represents a three-dimensional spherical graphic that may be in superimposed upon the panoramic video and/or displayed in a separate region or window. The graphic 452 includes a center 454 corresponding to a central location of the camera or cameras utilized to capture the panoramic video. The graphic 452 includes a boundary 456 that may be arbitrarily defined or defined to correspond to a physical aspect of the scene. The graphic 452 includes an FOV marker 458 corresponding to an FOV segment currently being displayed. The graphic 452 also includes a POI marker 470 indicating a location of the POI relative to the FOV segment. While not illustrated, optionally, POI viewing angles and an FOV viewing direction marker may be included.

Figure 5:
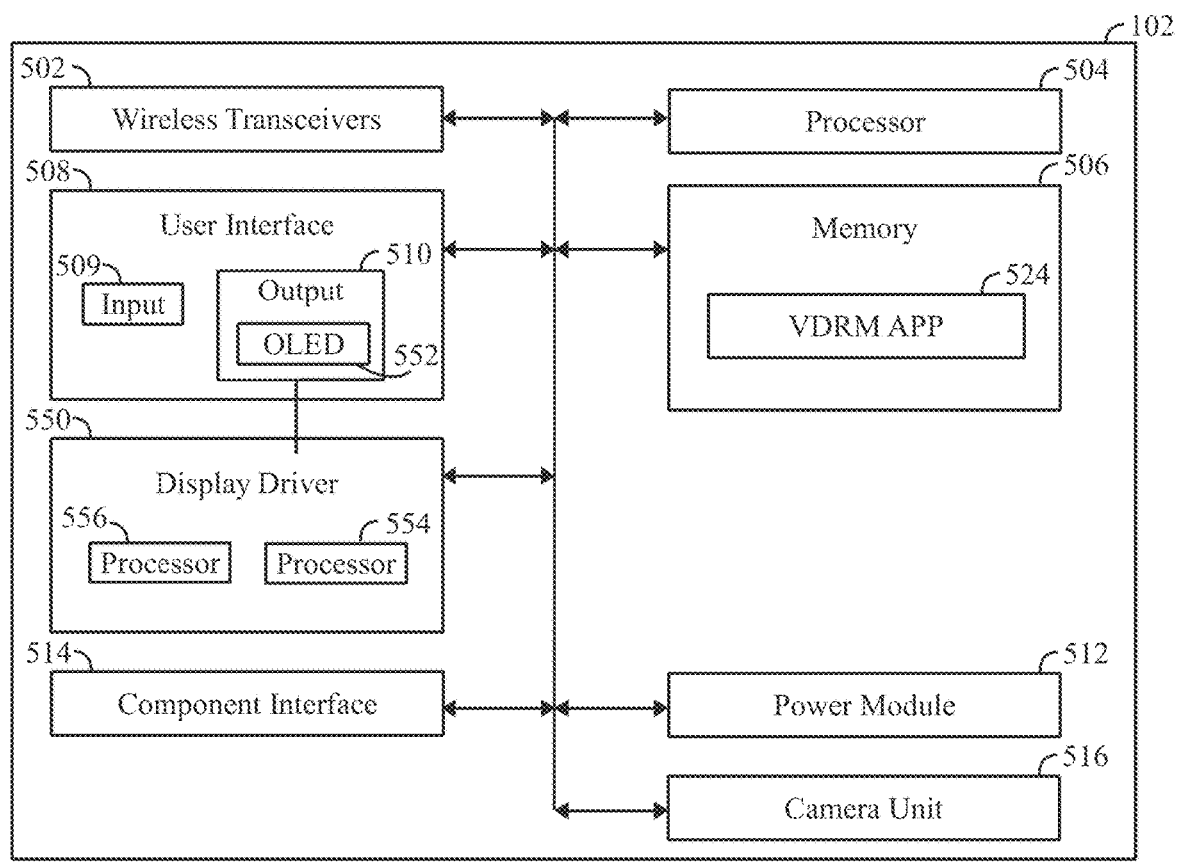
FIG. 5 illustrates a simplified block diagram of internal components of the electronic device configured in accordance with embodiments herein.

FIG. 5 illustrates a simplified block diagram of internal components of the electronic device 102 configured in accordance with embodiments herein. The device 102 includes components such as one or more wireless transceivers 502, one or more processors 504 (e.g., a microprocessor, microcomputer, application-specific integrated circuit, etc.), one or more memory (also referred to as a memory) 506, a user interface 508 which includes one or more input devices 509 and one or more output devices 510, a power module 512, a component interface 514 and a camera unit 516. All of these components can be operatively coupled to one another, and can be in communication with one another, by way of one or more internal communication links, such as an internal bus. The camera unit 516 may capture one or more frames of image data.

The input and output devices 509, 510 may each include a variety of visual, audio, and/or mechanical devices. For example, the input devices 509 can include a visual input device such as an optical sensor or camera, an audio input device such as a microphone, and a mechanical input device such as a keyboard, keypad, selection hard and/or soft buttons, switch, touchpad, touch screen, icons on a touch screen, a touch sensitive areas on a touch sensitive screen and/or any combination thereof. Similarly, the output devices 510 can include a visual output device, one or more light emitting diode indicators, an audio output device such as a speaker, alarm and/or buzzer, and a mechanical output device such as a vibrating mechanism. The display may be touch sensitive to various types of touch and gestures. As further examples, the output device(s) 510 may include a touch sensitive screen, a non-touch sensitive screen, a text-only display, a smart phone display, an audio output (e.g., a speaker or headphone jack), and/or any combination thereof. Optionally, the input devices 509 may include one or more touch sensitive layers provided on the front and/or rear sides of the display 552. The output devices 510 include a flexible display layer, such as an OLED display 552.

The transceiver 502 can utilize a known wireless technology for communication. Exemplary operation of the wireless transceivers 502 in conjunction with other components of the device 102 may take a variety of forms and may include, for example, operation in which, upon reception of wireless signals, the components of device 102 detect communication signals from secondary devices and the transceiver 502 demodulates the communication signals to recover incoming information, such as responses to inquiry requests, voice and/or data, transmitted by the wireless signals. The processor 504 formats outgoing information and conveys the outgoing information to one or more of the wireless transceivers 502 for modulation to communication signals. The wireless transceiver(s) 502 convey the modulated signals to a remote device, such as a cell tower or a remote server (not shown).

The memory 506 can encompass one or more memory devices of any of a variety of forms (e.g., read only memory, random access memory, static random access memory, dynamic random access memory, etc.) and can be used by the processor 504 to store and retrieve data. The data that is stored by the memory 506 can include, but need not be limited to, operating systems, applications, user collected content and informational data. Each operating system includes executable code that controls basic functions of the device, such as interaction among the various components, communication with external devices via the wireless transceivers 502 and/or the component interface 514, and storage and retrieval of applications and data to and from the memory 506. Each application includes executable code that utilizes an operating system to provide more specific functionality for the communication devices, such as file system service and handling of protected and unprotected data stored in the memory 506.

A video display and replay management (VDRM) application 524 is stored in the memory 506. The VDRM application 524 includes instructions accessible by the one or more processors 504 to direct a processor 504 to implement the methods, processes and operations described herein including, but not limited to the methods, processes and operations illustrated in the Figures and described in connection with the Figures. The VDRM application 524 manages operation of the processor 504, display driver 550 and/or a video card in connection with embodiments herein. In accordance with at least one embodiment, a touch sensitive layer is located over the secondary viewing region of the display layer on the back surface of the display unit.

Other applications stored in the memory 506 include various application program interfaces (APIs), some of which provide links to/from the cloud hosting service. The power module 512 preferably includes a power supply, such as a battery, for providing power to the other components while enabling the device 102 to be portable, as well as circuitry providing for the battery to be recharged. The component interface 514 provides a direct connection to other devices, auxiliary components, or accessories for additional or enhanced functionality, and in particular, can include a USB port for linking to a user device with a USB cable.

A display driver 550 is coupled to the processor 504 and configured to manage display of content on a display 552. Optionally, the display driver 550 includes display memory 554 and one or more display control processors 556. The display memory 554 includes multiple sections, to which the display control processors 556 and/or processor 504 write content to be displayed. Optionally, the display driver 550 may omit a separate processor and memory, and alternatively or additionally, utilize sections of the memory 506 as display memory and the processor 504 to manage writing content to a display memory section within the memory 506.

Figure 6:
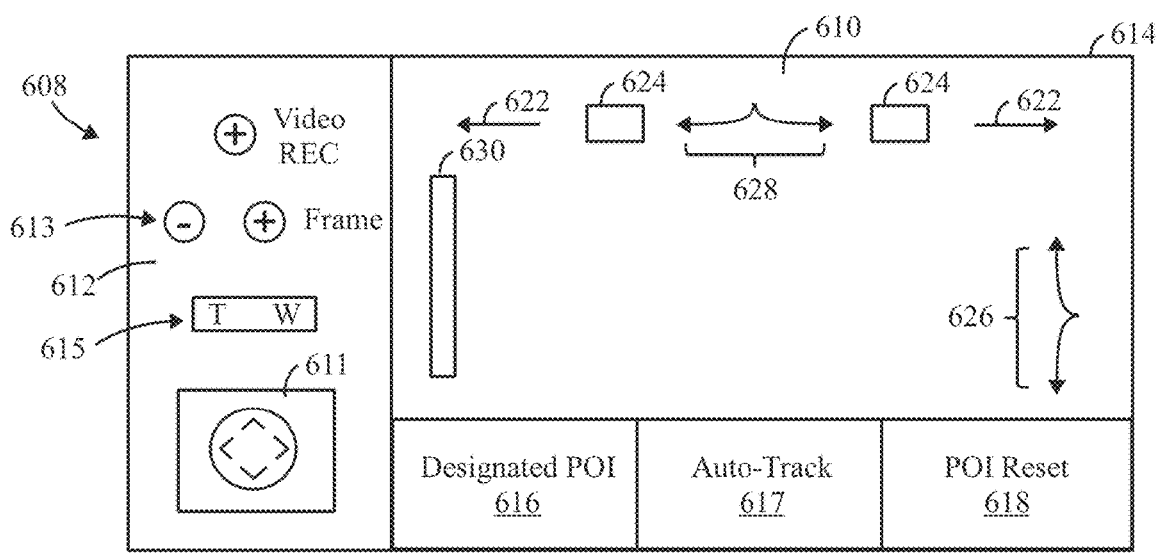
FIG. 6 illustrates a user interface that may be implemented on the device in accordance with embodiments herein.

FIG. 6 illustrates a user interface 608 that may be implemented on the device 102 in accordance with embodiments herein. The user interface 608 may be entirely or only partially touch sensitive. The user interface 608 generally includes an input area 612 and a display area 610. The input area 612 may include one or more buttons, soft-keys, switches and the like, to receive inputs from the user in connection with carrying out various operations supported by the device 102.

The display area 610 includes a scene window 614. The scene window 614 displays the FOV segment from the panoramic video. The input area 612 includes various user inputs. For example, a video record button/icon may be provided when the user interface 608 is utilized in connection with recording panoramic videos. The input area 612 includes frame step inputs 613 that may be utilized to step forward or backward one or more frames within a previously recorded panoramic video, such as in connection with identifying a frame of interest. As one example, the frame step inputs 613 may be utilized to step two particular frames in which a POI is at a desired location, from which the user may designate the POI for which position data is to be determined. The input area 612 includes a widened/telephoto input 615 to zoom in and out word. The input 615 may be utilized while recording a video and/or while playing back a panoramic video, such as to zoom in on a particular portion of the scene. A view angle adjustment control 611 allows the user to adjust the field-of-view, such as panning left or right and/or adjusting the elevation of view upward and downward.

Optionally, the input area 612 also includes a POI designate icon 616, and auto track icon 617 and a POI reset icon 618. The POI designate icon 616 may be utilized when the user is identifying a point of interest to be tracked. For example, the user may center the field-of-view on a point of interest and/or maneuver a cursor to be centered on a point of interest, after which the user selects the POI designator icon 616 to direct the device to begin tracking the selected object. An auto track icon 617 may be utilized when it is desirable to afford the functionality to automatically move the FOV segment to track a POI. The POI reset icon 618 may be utilized when the device is being operated in a non-auto tracking mode (e.g., when the user is adjusting the field-of-view manually through the user input). As explained herein, when the field-of-view is moved away from a POI and the user desires to reset the field-of-view relative to the POI, the POI reset icon 618 may be selected.

The scene window 614 presents the FOV segment from the panoramic video. As explained herein, indicia may be presented to inform the user of a location of the POI. For example, when the user navigates the FOV segment away from the POI, one or more POI trackers may be displayed (e.g., superimposed on or otherwise code displayed with) the panoramic video. For example, when the POI tracker may include left/right arrow indicia 622. One or both of the arrow indicia 622 may be displayed to indicate the direction to move the FOV to locate the POI. For example, one arrow indicia 622 may be presented, corresponding to the direction in which the POIs located. Alternatively, both arrows 622 may be presented, with only one arrow highlighted to indicate the direction of the POI. Alternatively or additionally, alphanumeric indicia 624 may be presented to indicate a suggested direction and/or distance to move the FOV to locate the POI. Additionally or alternatively, rotate up/down arrow indicia 626 may be displayed when suggesting to adjust the tilt of the FOV to locate the POI.

Optionally, the arrow indicia 622 and 628 may be replaced or supplemented with graphics, such as color-coded bars 630 along an edge of the scene window 614. A color-coded bar 630 may be highlighted to indicate a suggestion or instruction to move in a corresponding direction. The color of the bar 630 may correspond to an amount of movement suggested or instruction. For example, the bar 630 may be illustrated along the left side of the display to indicate a suggestion to move to the left. The bar 630 may be illustrated in yellow to indicate that a slight movement is suggested, in orange to indicate that a large movement is suggested, in green to indicate that movement should be stopped as the POI is now in the FOV. Optionally, the bar 630 may be illustrated in red to indicate that too much movement has occurred and that the FOV has been moved too far. Similarly, bars may be presented on the right side, top and/or bottom of the scene window 614, for which the colors are managed in a similar manner to output adjustment suggestions.

Additionally or alternatively, alphanumeric text and/or spoken audible instructions may be presented as output of the adjustment. The following are examples of messages that may be displayed as text or audibly spoken through a speaker of the device 102: "move left 5 feet", "move right 10 yards", "step back 10 feet", "tilt the field-of-view up more", "the point of interest is behind you", etc.

The above examples for the display format, display content, indicia and the like are not to be construed as limited. It is recognized that numerous other display formats, display content, and indicia may be used to output adjustment suggestions. It is recognized that the indicia may be formatted in various manners and presented without or outside the scene window 614.

In accordance with at least one embodiment herein, to the extent that mobile devices are discussed herein, it should be understood that they can represent a very wide range of devices, applicable to a very wide range of settings. Thus, by way of illustrative and non-restrictive examples, such devices and/or settings can include mobile telephones, tablet computers, and other portable computers such as portable laptop computers.

CLOSING STATEMENTS

Before concluding, it is to be understood that although e.g., a software application for undertaking embodiments herein may be vended with a device such as the system 100, embodiments herein apply in instances where such an application is e.g., downloaded from a server to a device over a network such as the Internet. Furthermore, embodiments herein apply in instances where e.g., such an application is included on a computer readable storage medium that is being vended and/or provided, where the computer readable storage medium is not a carrier wave or a signal per se.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A computer implemented method, comprising:
under control of one or more processors configured with executable instructions,
obtaining a panoramic video for a scene, the panoramic video having a coordinate system;
identifying a point of interest (POI) from the scene within the panoramic video;
calculating directional sound information related to a sound origin of the POI;
tracking a position of the POI within the panoramic video;
playing back of the panoramic video while displaying a field-of-view (FOV) segment comprising:
during automatic tracking, automatically changing the FOV segment, from the panoramic video, to maintain the POI in the FOV segment based on the directional sound information indicating a change in the position of the POI during the panoramic video; and during manual navigation, changing the FOV segment, based on a user input, including navigating the FOV segment away from the POI such that the POI is no longer in the FOV segment; and presenting a POI reset and automatically adjusting the FOV segment to include the POI in connection with selection of the POI reset, the POI reset provided as a shortcut to allow resetting the FOV segment to include the POI.

2. The method of claim 1, wherein the POI position data includes a view angle between the POI and a reference view direction of the coordinate system.

3. The method of claim 1, further comprising recording and storing different sound directional information related to the sound origin of first and second POIs during different frames in the panoramic video, utilizing the sound directional information during the playing back to switch the FOV segment between the first and second POIs.

4. The method of claim 1, wherein, during the automatic tracking, stepping through at least a portion of frames in the panoramic video based on the sound directional information.

5. The method of claim 1, wherein, during the automatic tracking, changing the FOV segment based on movement indicated by the sound directional information, the panoramic video includes a series of frames that are 360° views of the scene over a time period.

6. The method of claim 1, further comprising, while playing back the panoramic video, displaying a POI tracker based on the sound directional information to guide a user input for adjusting the FOV segment.

7. The method of claim 6, further comprising displaying a POI tracker indicative of the position of the POI within the panoramic video, the POI tracker indicating a direction to move the FOV segment to track a location of a sound origin from the POI.

8. The method of claim 7, wherein the POI tracker is displayed after the FOV segment navigates away from the POI.

9. The method of claim 1, further comprising, while playing back the panoramic video, automatically adjusting the field of view (FOV) based on the POI position data to maintain the POI in the FOV.

10. A device, comprising:
a processor;
a memory storing instructions accessible by the processor;
wherein, responsive to execution of the instructions, the processor performs the following:
playing back a panoramic video for a scene, the panoramic video having a coordinate system and having a point of interest (POI) that moves within the scene;
displaying a field-of-view (FOV) segment from the panoramic video;
during automatic tracking, automatically changing the FOV segment to maintain the POI in the FOV segment based on POI position data indicating a change in a position of the POI during the panoramic video;
during manual navigation, changing the FOV segment, based on a user input, including navigating the FOV segment away from the POI such that the POI is no longer in the FOV segment; and
generating and displaying a POI tracker and a POI reset, wherein the processor automatically adjusts the FOV segment to include the POI in connection with selection of the POI reset, the POI reset provided as a shortcut to allow resetting the FOV segment to include the POI, wherein, responsive to execution of the instructions, the processor to access metadata stored in connection with the panoramic video, the metadata including sound directional information related to a sound origin of the POI associated with at least a portion of frames in the panoramic video, the processor to utilize the sound directional information for the sound origin during the playing back to guide the FOV segment to the POI.

11. The device of claim 10, wherein, responsive to execution of the instructions, the processor to track automatically the POI by adjusting the FOV segment during playback of the panoramic video based on the sound directional information.

12. The device of claim 10, wherein, responsive to execution of the instructions, the processor to adjust the FOV segment, to be displayed, based on movement indicated by the sound directional information related to the sound origin of the POI.

13. The device of claim 10, wherein, responsive to execution of the instructions, the processor to co-display the POI tracker and the FOV segment, the POI tracker representing a graphic of the scene with an FOV marker and a POI marker, the FOV marker indicative of a location of the FOV segment, the POI marker indicative of a location of the POI.

14. The device of claim 10, further comprising a 360° microphone unit to collect audio signals, the POI position data based on the audio signals.

15. The device of claim 10, the POI tracker including one or more of a bird's-eye view perspective, side perspective view or rear view perspective of the scene represented as one or more of an animation, sketch and/or cartoon version of a generic scene.

16. The device of claim 10, wherein the FOV segment includes an actual rendered image from an elevational view based on the video content within the panoramic video.

17. A computer program product comprising a non-transitory computer readable storage medium comprising computer executable code to:
playback a panoramic video for a scene, the panoramic video having a coordinate system with a reference point and having a point of interest (POI) that moves within the scene;
display a field-of-view (FOV) segment from the panoramic video; and
during automatic tracking, automatically change the FOV segment to maintain the POI in the FOV segment based on POI position data indicating a change in a position of the POI during the panoramic video as the POI moves from a first position to a second position;
during manual navigation, change the FOV segment, based on a user input, including navigating the FOV segment away from the POI such that the POI is no longer in the FOV segment; and
present a POI reset and automatically adjust the FOV segment to include the POI in connection with selection of the POI reset, the POI reset provided as a shortcut to allow resetting the FOV segment to include the POI, wherein the computer executable code further adjusts the FOV segment to be displayed, based on sound directional information related to a sound origin of the POI.

18. The computer program product of claim 17, wherein the computer executable code further tracks the POI automatically by adjusting the FOV segment during playback of the panoramic video in connection with automatic tracking of the POI.

* * * * *